(No Model.)   2 Sheets—Sheet 1.

L. B. CLOGSTON.
Slate Sawing Machine.

No. 232,000.   Patented Sept. 7, 1880.

Witnesses. Charles Selkirk
John A. Selkirk

Lucius B. Clogston
Inventor.
His Atty Alex. Selkirk (No Model.) 2 Sheets—Sheet 2.
L. B. CLOGSTON.
Slate Sawing Machine.
No. 232,000. Patented Sept. 7, 1880.
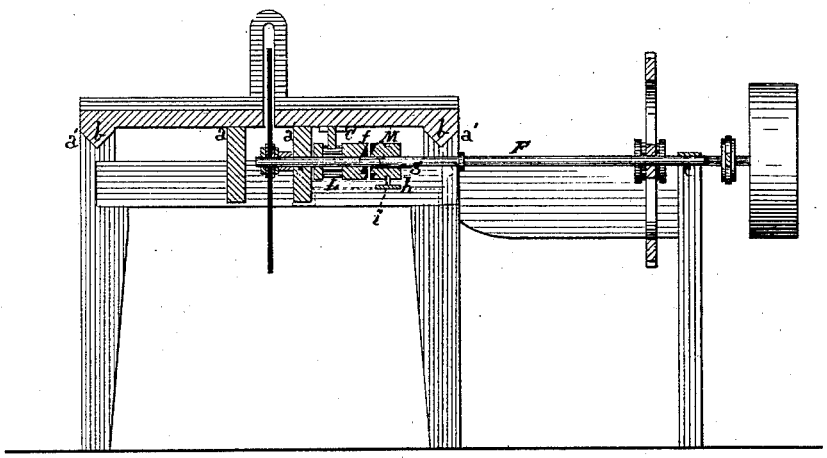
Fig. 3.
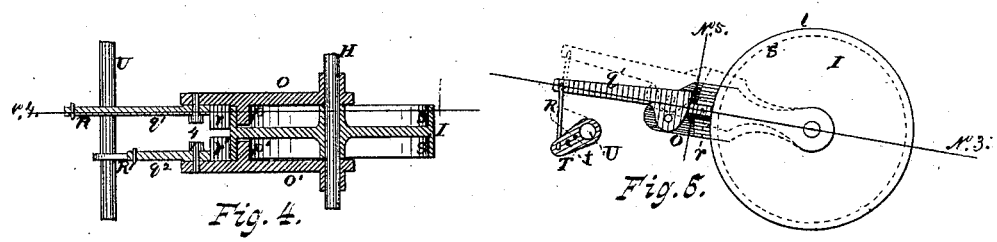
Fig. 4.   Fig. 5.
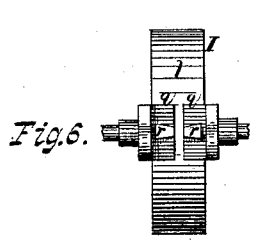   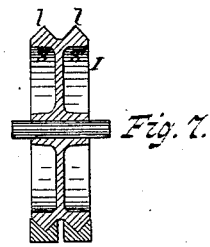
Fig. 6.   Fig. 7.
Witnesses.
Charles Selkirk
John A Selkirk
Lucius B. Clogston
Inventor.
by his Atty
Alex. Selkirk

UNITED STATES PATENT OFFICE.

LUCIUS B. CLOGSTON, OF FAIR HAVEN, VERMONT.

SLATE-SAWING MACHINE.

SPECIFICATION forming part of Letters Patent No. 232,000, dated September 7, 1880.

Application filed April 26, 1880. (No model.)

*To all whom it may concern:*

Be it known that I, LUCIUS B. CLOGSTON, of Fair Haven, in the county of Rutland and State of Vermont, have invented new and useful Improvements in Slate-Sawing Machines, of which the following is a specification.

My invention relates to improvements in machines for sawing slate in which the motion of the prime-moving band-wheel, or other equivalent wheel, will communicate motion to the saw, and at the same time be made to communicate motion to a movable table which carries the block, and carry the slate thereon against the saw with a greater or less degree of rapidity, as may be selected, while operating the same, and also be made to communicate motion in a reverse direction to the table to carry it back with a greater speed.

Figure 1:
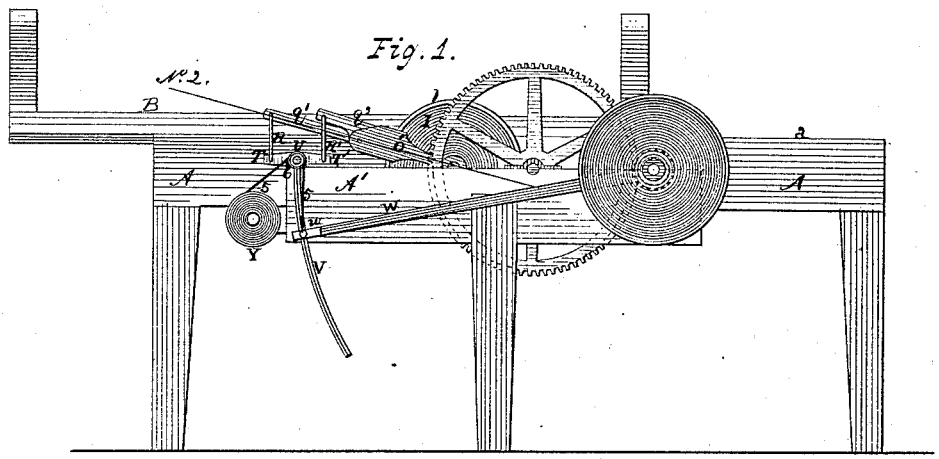
Figure 2:
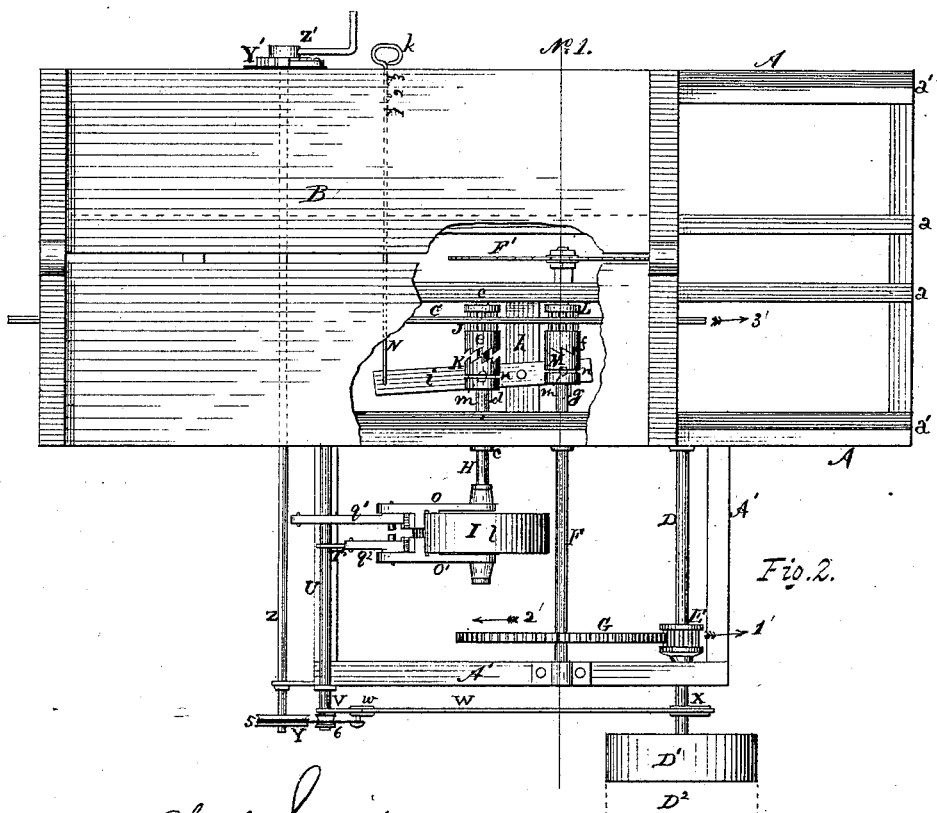

The objects of my improvements are to produce, in a slate-sawing machine, mechanism which will cause the table carrying the slate to be moved forward with a slow speed and backward with a faster speed, at the will of the operator; and to cause the forward movement of the table to be increased or diminished, as may be selected; and to provide special mechanism by which the increased or diminished speed of the forward movement of the table may be readily imparted; and to provide means by which the prime-moving shaft will be made to operate all parts of the machine and the operator be enabled to regulate at will the speed of the forward movement of the slate against the saw and cause the slate to be carried back from the saw without stopping the revolving of the prime-moving shaft or drive-wheel. I attain these objects by the mechanism illustrated in the accompanying drawings, in which—
Figure 1 represents a side elevation of the machine. Fig. 2 is a plan view of the same with a portion of the table broken away. Fig. 3 is a sectional elevation taken at line No. 1 in Fig. 2. Fig. 4 is a cross-sectional view of the feed-wheel and its actuating mechanism, taken at line No. 2 in Fig. 1 and line No. 3 in Fig. 5. Fig. 5 is a sectional view of the feed mechanism, taken at line No. 4 in Fig. 4. Fig. 6 is a plan view of the friction-wheel and friction-griping devices, taken at line No. 5 in Fig. 5; and Fig. 7 illustrates a modification of the friction-surface of the feed-wheel and griping-blocks employed therewith.

Similar letters refer to similar parts throughout the several views.

In the drawings, A represents the main frame of the machine, which main frame supports the movable table B, resting on ways $a$ $a$ and $a'$ $a'$, and guided by the V-shaped ways $b$ $b$, made in the lower side of said table, and working in ways $a'$ $a'$, as shown in Fig. 3. The frame A is stiffened by struts running from side to side, in the usual manner practiced by the trade. Securely attached to the said main frame, from one of its sides, is the gear-shaft frame A'. Securely attached to or cast solid with table B is the tooth-rack C, Figs. 2 and 3, which tooth-rack extends the full length of said table on its lower side.

D is the drive-pulley shaft, carrying the driving pulley or wheel D' and loose wheel $D^2$. Secured to shaft D is the pinion E, which actuates gear-wheel G, secured to shaft F, which carries the arbor of saw F'.

All the above-described parts are old and well-known in slate-sawing machines, and were or are used in connection with other devices which are entirely dispensed with by me, by reason of the employment of the devices and parts embodied in my improved machine.

Supported in bearings $c$ $c$ is the feed-wheel shaft H, which shaft carries the feed-wheel I, secured to it, loose rack-pinion J, having one end provided with clutch-teeth $e$, and the loose clutch K, as shown in Figs. 2 and 3. The loose clutch is held so as to turn with shaft H by a spline or feather, $d$, and at the same time be free to be moved in either direction on said shaft to engage with the teeth $e$ of pinion J, or be disengaged from the same.

On the saw-shaft F is placed the loose pinion L, provided at one end with clutch-teeth $f f$, running in opposite direction to the teeth $e$ $e$ of pinion J. A loose clutch, M, works on shaft F, and is held with the same by spline $g$. Secured to the frame, from its lower side, is bar $h$, to which is pivoted the shipping-lever $i$, which carries forks $m$ $m$, pivoted to said shipping-lever and working in grooves $n$ $n$, made in clutches K and M. Pivoted to the rear end of shipping-lever $i$ is the shipping-bar N, provided with handle $k$ and catches 1, 2, and 3.

The feed-wheel I is secured to shaft H and revolves the same, and is provided with a friction surface or periphery, $l$, Figs. 2, 4, 5, 6, and 7, and the internal friction-surfaces, $s\ s'$. (Shown in Figs. 4 and 5.)

Arranged loosely on shaft H and at the sides of the feed-wheel are the arms O O', which vibrate on said shaft. Made solid with each of said arms are griping-lips $p\ p'$, which griping-lips work against the internal friction-surfaces, $s\ s'$, as shown in Figs. 4 and 5. Cast solid also with said arms are lugs $q\ q$, which lugs hold movable friction-blocks $r\ r'$, which rest on the friction-surface of the periphery $l$, as shown in Figs. 4, 5, and 6. Pivoted to the arms O O', as at 4, are the levers $q'\ q^2$, the short ends of which levers are made slightly oblique, and bear on the movable blocks or dogs $r\ r'$, while the long ends of said levers are pivoted to the arms or rods R R', which arms R R', together with levers $q'\ q^2$, form substantially a pair of toggle-levers, which, when operated alternately, will exert pressure on the friction-dogs $r\ r'$, to cause the same to hug on the friction-surface $l$ of the feed-wheel, and be alternately released from the same, while at the same time they will cause the friction-lips $p\ p'$ to alternately hug the internal friction-surfaces, $s\ s'$, and release the same. The opposite ends of arms R R' are pivoted to the arms T T', attached to or made solid with the rock-shaft U, which rock-shaft is supported in suitable bearings from the frame. The said arms T T' may be provided with several pivot-holes, $t\ t$, from any of which the arms or rods R R' may be pivoted. Secured to the rock-shaft U is the rock-lever V, which rock-lever is actuated by pitman or eccentric rod W, operated by eccentric X on shaft D of the driving-wheel D'. The said pitman is connected to rock-lever V by a housing, $w$, or sleeve, which may be moved on said rock-lever in either direction. Rollers may be placed in said housing to bear against the edges of lever V, and relieve it from excessive friction.

A wheel, Y, secured to shaft $z$, and provided with a cord, chain, or wire, 5, is provided for raising or lowering the end of the pitman-rod connected with rock-lever V, as shown in Figs. 1 and 2. The shaft $z$ runs beneath the frame of the machine, and extends to the opposite side of the same, and is supported in bearings, and provided with a ratchet-wheel and pawl, Y', and crank handle or wheel $z'$. The cord 5 passes over pulley 6, as it runs from wheel Y, to the housing $w$ of the pitman.

The manner in which the several parts of this invention operate is as follows: When power is applied to band-wheel D' the pinion E will be revolved in direction of arrow 1', and will actuate gear-wheel G in direction of arrow 2', and thereby give motion to saw F'. When the shipping-bar N is so moved by the operator as to cause catch 2 of said bar to engage with the frame the shipping-lever $i$ will be held so as to throw both clutches M and K out of engagement or contact with their respective pinions L and J, so that said pinions will be idle.

When the shipping-bar N is pushed inward so as to cause its catch 3 to engage with the frame the clutch M will be thrown in engagement with pinion L, and cause it to revolve and operate with rack C of table B, to carry the said table backward with a considerable speed.

When said shipping-bar is pulled outward, so that its catch 1 will hold with the frame, the shipping-lever $i$ will throw clutch M out of engagement with pinion L and clutch K into engagement with pinion J, when said pinions will be revolved forward by the feed-wheel shaft H, and will operate, with rack C of table B, to carry said table forward in direction of arrow 3' in Fig. 2.

The shaft D being revolved will also revolve the eccentric X, and thereby impart a reciprocating motion to pitman W, which pitman will give to the rock-lever V a vibrating movement, and thereby oscillate rock-shaft U and its connecting-arms T T', which arms will be alternately vibrated in opposite directions, as indicated by full and dotted lines in Fig. 5.

When the rear arm, T, is vibrated upward it will carry the rod or arm R and lever $q'$ upward, and lever $q'$ will swing on pivot 4, and throw the face of the short end of said lever against the friction block or dog $r$, and force the same tightly against the friction-surface $l$ of the feed-wheel, and at the same time draw the griping-lip $p$ of arm O against the internal friction-surface, $s$, so that the rim of said wheel will be strongly griped. The upward movement of the lever $q'$ being continued, the arm O will be carried upward to the distance limited by the oscillation of the rock-shaft, or as indicated by dotted lines in Fig. 5, and thereby cause the feed-wheel to be turned to a short distance.

While the said rear arm, T, of rock-shaft U is being oscillated upward and is actuating the feed-wheel through the parts R, $q'$, O, and $r$, as described, the forward arm, T', will be oscillated downward, and draw its connecting-arm R', lever $q^2$, and arm O' downward, with the short arm of lever $q'$ freed from contact with its friction-dog $r$, so as to free the same from all bite on the feed-wheel.

When the rock-shaft is oscillated in an opposite direction, so as to carry the rear arm, T, of the same back and downward, the friction-dog $r$ and lip $p$ will release their bite on the friction-surfaces of the feed-wheel, while at the same time the arm T' will be oscillated upward and, through the parts R' and $q^2$, cause the friction-dog $r'$ to bite the feed-wheel, together with the lip $p'$, and gripe the said wheel, and, through arm O', turn the feed-wheel to a short distance.

It will be readily observed that, by reason of the form of construction of the friction-dogs $r\ r'$ and their manner of arrangement in relation to the feed-wheel, the said dogs are made to have a movement toward and from the friction-surface $l$ or periphery of said wheel which is wholly in the direction of a radial line from the axis of the same, and not tangentially, as friction dogs or gripes have heretofore been employed with friction-clutches and feed-wheels, and that by reason of this radial line of movement of the said dogs the frictional surface with which said dogs operate will not become indented and cut away, as is the case with those friction-wheels which employ dogs or obliquely-operating gripes or wrench-levers, which impart a bite to the wheel by the action of the corner edges of blocks or keys as heretofore employed; and it will be further observed that the dogs or lips $p\ p'$, operating with the internal frictional surfaces, $s\ s$, of the feed-wheel, have their movements, though slight, in the direction of a line radial from the axis of said feed-wheel, the same as that of dogs $r\ r'$, and though their movements are in the same radial line, yet when dogs $r$ and $p$ and $r'$ and $p'$, in their respective pairs, are simultaneously moved in frictional contact with their friction-surfaces respectively their movements will be in opposite directions on the same radial line, and the contact of one of the dogs of each pair will be made to be reactive against the other one of the same pair, so that the side marginal rims of the feed-wheel will be firmly and forcibly griped from the opposite sides without the surfaces being indented or cut, as they are by the friction dogs, gripes, or wrenches heretofore employed and operating tangentially, obliquely, or by the action of the corner edges of friction blocks or pieces.

The oscillations of the rock-shaft being continued in alternate directions will impart to levers $q'$ and $q^2$ alternate vibrations, and each will alternately force their respective friction-dogs to bite on the feed-wheel, and move the same to a short distance and release the same, so that the feed-wheel will be made to slowly revolve by reason of the impulses given it by the biting of the friction-dogs and lugs on the friction-surfaces of the same and the upward vibrations of the arms O O' at the time the bite is made.

The clutch K being in engagement with pinion J, and shaft H being revolved by the vibrations of the arms O O' and the operations of the friction-dogs $r\ r'$ and lugs $p\ p'$ with the feed-wheel, the said pinion will be made to move the table B in a direction toward the cutting side of the saw through the rack C.

When the connecting end of the pitman W, connecting with the rock-lever V, is moved up to the head of said rock-lever, or to near the rock-shaft U, the feed-wheel will be revolved with greatest speed as the pitman is operated by the eccentric X, and when the end of the said pitman is moved downward from the head end of said rock-lever to the tail end of the same, the feed-wheel will be revolved slower; and the feed-wheel may have given to it a higher or lower rate of speed, as may be selected, by simply shifting the end of the pitman to any selected point between the two ends of the rock-lever which will correspond with the length of the oscillation of the rock-shaft desired to be had. For lengthening or shortening the arc of the circle the arms O O' are to travel at each vibration.

A further change of the speed of the feed-wheel may be effected by pivoting the arms or rods R R' to the arms T T' at points higher to or farther from the rock-shaft; and when said arms or rods R R' are pivoted to arms T T' at their outer ends the speed of the feed-wheel will be increased, while when pivoted at points higher to the rock-shaft the speed will be lessened.

When operating with a block of slate of varying thickness in its length, or of different degrees of hardness, the operator will regulate the speed of the feed-wheel for feeding the slate forward to the saw by means of the hand wheel or crank $z'$, shaft $z$, wheel Y, and cord 5, and effect an elevation of the connecting end of the pitman on the rock-lever when the slate is thin and a gradual lowering of the pitman as the slate becomes thicker or harder. This increase or diminution of the speed of the feed-wheel and the feed of the slate to the saw can be at all times readily effected by the operator while the several parts of the machine are in operation sawing the slate.

Fig. 7 illustrates a modification of the form of the outer surface of the feed-wheel I, in which are shown annular V-shaped projections, which may be employed instead of the plane surfaces $l$, if selected. In such a case the bearing ends of the friction-dogs $r\ r'$ are to be made to correspond with the said V-shaped annular projections $l\ l$, as shown in said figure.

It is obvious that should the feed-wheel I be provided with ratchet-teeth, and the arms O O' be each provided with pawls, and all the other parts be employed, a similar rotation of the feed-wheel would be effected when the rock-shaft is oscillated; but in such a case no such nice adjustment of degrees of speed of the feed-wheel could be had as with the friction-dogs and friction-surfaces of the feed-wheel above described. Therefore I give preference to the friction devices described, though teeth in the face of the feed-wheel and pawls may be considered as equivalents to the friction devices employed by me.

It will be readily observed that should the friction-lips $p\ p'$ be dispensed with the friction dogs or blocks $r\ r'$ would operate against the friction-surface $l$ of the feed-wheel and react against the draft of the arms O O' on the feed-wheel shaft with a similar effect, but with a less degree of force, than would the lips $p\ p'$ on the surfaces $s\ s$, as described.

It will also be readily observed that by the above-described improvements one set of driving-band wheels, together with their bands, shafts, bearings, and also two pairs of cone-pulleys, and the bevel-gears, worm-gears, racks, and universal joints heretofore employed in slate-sawing machines are entirely dispensed with, and that the number of operating parts are greatly reduced, and also that the operator, standing at one side of the machine, can readily control the machine, increase or lessen the speed of the feed of the slate to the saw, and reverse the movement of the table carrying the slate, or stop the movement of the table at any point, as occasion may require or at any time he may select.

Having described my invention, what I claim, and desire to secure by Letters Patent, is—

1. In a slate-sawing machine, the combination, with the shaft revolving the saw in one direction and the feed-wheel shaft revolving in an opposite direction, of loose pinions L and J, clutches M and K, and shipping-lever $i$, whereby the rack C will be operated to carry table B either forward toward the cutting side of the saw or backward from the same, as described.

2. In a slate-sawing machine, the combination, with the shaft carrying the pinion operating with the rack C of the table to carry the same forward toward the cutting side of the saw, of a feed-wheel secured to said pinion-shaft and revolved with a slow movement by vibrating mechanism operated by a rock or oscillating shaft and acting upon the periphery of said feed-wheel, substantially as and for the purpose set forth.

3. In a slate-sawing machine, the combination and arrangement, with the wheel I, of the friction-dogs $r$ $r'$, acting each on the periphery of said wheel in a line of direction which is wholly radial from the axis of said wheel, and carried and operated by mechanism substantially in the manner and for the purposes set forth.

4. In a slate-sawing machine, a feed-gear formed by the combination and arrangement, with wheel I and arms O O', adapted to be vibrated from the shaft of said wheels, of friction-dogs $r$ $r'$, carried by said arms and confined to lines of movement which are wholly radial from or with the shaft of said wheel, and levers $q'$ $q^2$, which, when alternately operated, will force said dogs alternately in frictional contact with the periphery of said wheel and cause said arms to be alternately vibrated in the manner described, for the purposes set forth.

5. In a slate-sawing machine, the combination and arrangement, with wheel I, provided with external friction-surface, $l$, and internal friction-surfaces, $s$ $s$, of dogs $r$ $r'$ and $p$ $p'$, acting with said friction-surfaces respectively, as described, in lines of direction which are radial from the axis of said wheel but in opposite and reactive directions, and mechanism which will force said dogs in pairs, $r$ and $p$ and $r'$ and $p'$, alternately in frictional contact with said wheel and impart to them reciprocating movements alternately in opposite directions, as set forth.

6. The combination, with rock-shaft U, provided with arms T T', rods R R', levers $q'$ $q^2$, of the vibrating arms O O', dogs $r$ $r'$, and feed-wheel I, as and for the purpose set forth.

7. The combination, with feed-wheel I and dogs $r$ $r'$, carried by arms O O' and biting on said feed-wheel, and an oscillating shaft connected by levers jointed to said arms, of the rock-lever V, attached to said oscillating shaft, eccentric rod or pitman connected with said rock-lever so as to be moved to any point on the same, substantially as and for the purpose set forth.

8. The combination, with shaft D, revolving with a high speed, eccentric X, eccentric-rod W, and rock-shaft U, vibrated by said eccentric and rod, of the feed-wheel I, dogs $r$ $r'$, and mechanism operated by said rock-shaft to cause said dogs to bite on the surface of said wheel and move the same forward, whereby the said feed-wheel will be revolved with a lower speed by shaft D without the employment of intermediate gears, substantially as and for the purpose set forth.

9. The combination, with the saw-shaft revolved with a high speed and carrying a pinion to move table B backward, of a feed-wheel revolving a pinion to move the table forward, duplex friction devices alternately operating with said feed-wheel to rotate the same in a direction opposite to the revolution of the saw-shaft and with a lower speed than that of said saw-shaft, as and for the purpose set forth.

10. The combination, with rock-shaft U, provided with arms T T', and rock-lever V, actuated by a shaft rotating at high speed, and mechanism actuating duplex biting devices operating with feed-wheel I by a succession of vibrating movements imparted by eccentric-rod W, of mechanism Y', under control of the operator, and adapted to shift said eccentric-rod on said rock-lever, as and for the purpose set forth.

LUCIUS B. CLOGSTON.

Witnesses:
A. H. GRAY,
H. D. BACON.